Jan. 12, 1926.

R. L. MUDGE 1,568,992

MASTER LINK FOR CONVEYER CHAINS

Filed Feb. 10, 1925

INVENTOR.
Ralph. L. Mudge
BY
Gerald J. Baldwin
ATTORNEY.

Patented Jan. 12, 1926.

1,568,992

UNITED STATES PATENT OFFICE.

RALPH L. MUDGE, OF DETROIT, MICHIGAN.

MASTER LINK FOR CONVEYER CHAINS.

Application filed February 10, 1925. Serial No. 8,313.

*To all whom it may concern:*

Be it known that I, RALPH L. MUDGE, a citizen of the United States, residing at Detroit, in the county of Wayne and State of Michigan, have invented new and useful Improvements in Master Links for Conveyer Chains, of which the following is a specification.

This invention relates to master links for conveyer chains, and refers particularly to that type of conveyer chain which consists of inner and outer links, the latter used in pairs, arranged alternately, and connected to one another usually by double headed pins. Owing to the construction of that type of chain it is necessary to use the same number of inner links as there are pairs of outer links, as it is obviously impossible to directly connect two inner links or two outer links together, and at the same time keep the chain in line. Consequently the least amount by which a chain can be lengthened or shortened is the distance between the centre of one pin and the centre of the pin next but one to it; or in other words, if an inner link is inserted or removed a pair of outer links must also be inserted or removed correspondingly in order to be able to connect all the links of the chain together.

This invention aims to provide a master link for conveyer chains so constructed that the minimum amount by which the chain can be lengthened or shortened is approximately one half the present minimum amount for chains having the same length of link.

It is furthermore an object of the invention to provide a master link for conveyer chains one end of which will connect with an inner link and the other end with a pair of outer links, in such a manner that a straight pull will be communicated thereby, without there being any tendency for the links adjacent to the master link to twist.

With these and other objects in view, the construction entering into this invention will be hereinafter described with the aid of the accompanying drawings, in which.

Figure 1:
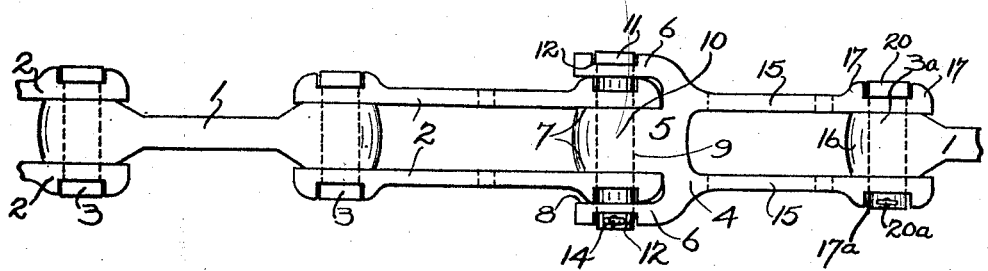
Figure 1 illustrates a plan view of the chain with the master link connecting two of the links.
Figure 2:
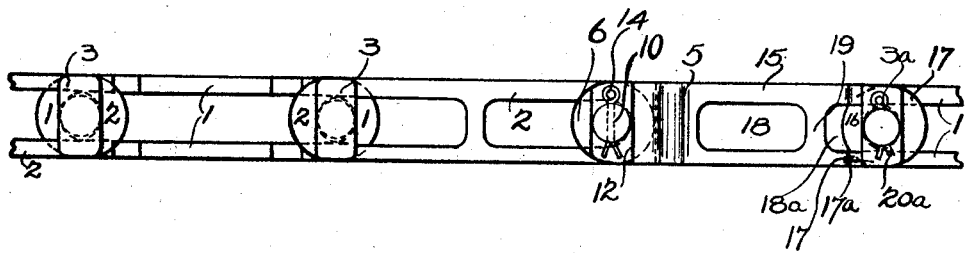
Figure 2 is a side view of Figure 1.
Figure 3:
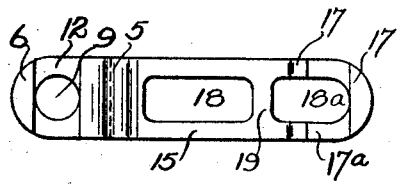
Figure 3 is a side view of the master link disconnected.

Referring to the drawings, 1 designates the inner links and 2 the outer links of an ordinary conveyer chain; these links are connected one to another by pins 3.

The master link 4 terminates at one end in a centrally disposed member 5, the outer faces 7 of which are so located as to form bearing faces for part of the inner surfaces of the outer links 2. Integral with the member 5, and connected to it, substantially opposite to one another and a short distance from the end of the said member, are two laterally disposed arms 6. The distance between the inner surfaces 8 of these arms and the outer faces 7 of the member 5 is such that the links 2 can be easily inserted therebetween. Through both the arms 6 and the member 5 a hole 9 is provided to receive the pin 10, the head 11 of which rests in one of the recesses 12. Through the opposite recess 12 the other end of the pin 10 projects, and is held in position by means of a split pin 14. As the two recesses 12 are identical the pin 10 can be inserted from either side.

Two elements 15, extending longitudinally from the member 5 with which they are united, are parallel to one another and so spaced as to engage an end 16 of any of the inner links 1. Vertical projections 17 are formed on the outer faces of the elements to hold the pin $3^a$ in position. The latter is usually provided with a head 20 at one end, and held in the opposite recess $17^a$ by means of split pin $20^a$. Though a double headed pin similar to the pins 3 may be used if desired; in that case however, it must be of sufficient length to enable it to be pushed far enough sideways for one head to be disengaged from one of the projections 17, because the elements 15 are spaced rigidly apart; whereas in the standard chain the outer links 2 may be pressed together against the narrower central portion of an inner link 1 when it is desired to insert or remove a pin 3. Openings 18 are provided transversely through the elements, and vertical ribs 19 may be employed for strengthening purposes, in which case the pins $3^a$ are inserted through the end openings $18^a$.

The master links can also be connected one to another so that in case of a shortage of standard links for instance the chain could be made up to length with a plurality of these master links connected one to the other; or again a chain could be made wholly of master links if desired. In that case their construction could be exactly as herein described and shown, though if built for that purpose the lugs 17 could be omitted and the arms 6 brought closer in to the sides of the member 5. And while the link can be inserted so as to run in either direction I prefer to insert it so that the elements 15 lead, as from that direction the link gradually widens, and it would, when running in that direction, more readily throw any obstruction out of its path.

It is thought that the utility of the invention is apparent without further description, and it is understood that the construction hereinbefore described is susceptible to such changes as fall within the scope of the appended claims.

What I claim is:—

1. A master link for conveyer chains comprising a central member having lateral arms one on each side thereof, substantially parallel to said member at their outer ends and their inner ends integral with said member, and a pin adapted to pass transversely through said member and said arms, in combination with two substantially parallel elements united to said member and extending in the opposite direction to said arms, transverse openings through said elements adapted to receive a pin and means for preventing rotation of said pin.

2. A master link for conveyer chains as described in claim 1, wherein the grooves formed between the outer sides of the central member and the inner sides of the lateral arms are adapted to receive the outer ends of the parallel elements of a similar link.

3. A master link for conveyer chains comprising a central member having two lateral arms integral therewith, said arms being disposed one on each side of said member, receiving grooves formed between said member and said arms, and a pin through said member and said arms adapted to connect them to links in said receiving grooves, in combination with longitudinal elements united to said members and terminating in ends having transverse openings through which a pin is arranged, said pin being adapted to hold an end of a link between said elements and means for preventing rotation of said pins.

4. A master link for conveyer chains comprising in combination, a central member, lateral arms integral with said member and disposed one on each side thereof, said arms having portion of their inner surfaces substantially parallel to said member, a transverse hole through said member and both of said arms adapted to receive a pin, recesses in the outer surfaces of said arms extending on both sides of said hole, adapted to receive the head of said pin and prevent rotation thereof, substantially parallel elements integral with said member having transverse openings therethrough and extending in the opposite direction to said arms, a pin adapted to extend transversely through both of said elements, and recesses in the outer surfaces of said elements to receive the head of said pin and prevent rotation thereof.

RALPH L. MUDGE.